3,590,039
N - (α,α,α,α',α',α' - HEXAFLUORO - 3,5 - XYLYL)
ANTHRANILIC ACID AND SALTS THEREOF
Alfred Sallmann, Bottmingen, and Rudolf Pfister, Basel,
Switzerland, assignors to Geigy Chemical Corporation,
Ardsley, N.Y.
No Drawing. Filed Dec. 9, 1968, Ser. No. 782,485
Claims priority, application Switzerland, Dec. 20, 1967,
17,890/67
Int. Cl. C07c *101/54*
U.S. Cl. 260—247.2                              2 Claims

ABSTRACT OF THE DISCLOSURE

N-(α,α,α,α',α',α'-hexafluoro-3,5-xylyl) - anthranilic acid and pharmaceutically acceptable salts thereof with a base are active ingredients in pharmaceutical compositions useful for the treatment of inflammatory diseases.

---

The present invention concerns a substituted anthranilic acid and pharmaceutically acceptable salts thereof with a base, pharmaceutical compositions containing such compounds, as well as a method of treating inflammatory diseases.

In particular, the present invention concerns N-(α,α,α,α',α',α'-hexafluoro - 3,5 - xylyl) - anthranilic acid of Formula I

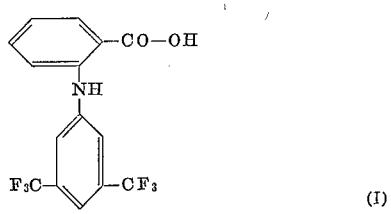

and pharmaceutically acceptable salts thereof with a base. It has been found that the compound of Formula I and its pharmaceutically acceptable salts possess valuable pharmacological properties, in particular anti-inflammatory, analgesic and antipyretic activities, together with a favorable therapeutic index.

The free acid and its salts with pharmaceutically acceptable inorganic and organic bases can be administered orally, rectally or locally, and aqueous solutions of the salts can also be administered parenterally, especially intramuscularly, as well as intravenously or subcutaneously in the treatment of rheumatic, arthritic and other inflammatory diseases of warm blooded animals.

The N-(α,α,α,α',α',α'-hexafluoro-3,5-xylyl) - anthranilic acid of Formula I and its salts are produced according to the invention by condensing an o-halogenobenzoic acid or a salt thereof with α,α,α,α'α'α'-hexafluoro-3,5-xylidine, optionally converting the salt obtained into the acid of Formula I and/or converting the free acid or the first salt obtained into a salt or another salt, as the case may be, with an inorganic or organic base. Preferably the condensation is carried out with heat and in the presence of a copper-containing catalyst as well as an acid binding agent in an organic solvent which is inert under the reaction conditions. As o-halogeno-benzoic acid, in particular o-chloro- or o-bromo-benzoic acid are used. As copper-containing catalyst, for example, metallic copper having a large surface area such as copper powder or copper sponge can be used, or copper compounds such as copper (I) chloride or bromide, copper (II) chloride, bromide, sulfate, acetate, carbonate or oxide. Suitable as acid binding agent are, for example, the alkali carbonates, e.g. potassium carbonate, copper (I) carbonate or copper (II) carbonate, or tertiary amines. When a free o-halogenobenzoic acid is used as starting material, preferably at least two equivalents of acid binding agent are used and then optionally the water which is set free when salt formation begins can be distilled off alone or together with part of the solvent before the main reaction begins. However, substantially one equivalent of acid binding agent is sufficient when a salt of an o-halogenobenzoic acid, e.g. an alkali salt such as the potassium salt is used as starting material, because in this case only the hydrogen halide freed during the condensation has to be neutralized. The reaction temperatures are preferably between 100 and 200°. If the condensation is carried out under normal pressure, then especially such an organic solvent is used that it boils within or above this range. Examples thereof are n-pentanol, isopentanol, n-butanol, dimethyl formamide, dimethyl sulfoxide or diethyleneglycol dimethyl ether. The main reaction can also be carried out in a closed vessel and in this case a solvent having a lower boiling point, e.g. a lower alkanol such as ethanol, isopropanol or methanol, can also be used as reaction medium.

Pharmaceutically acceptable salts include those derived from inorganic bases such as ammonia and the alkali and alkaline earth metals, e.g. sodium, potassium, magnesium and calcium, and those derived from organic amines such as ethylamine, triethylamine, diethylaminoethanol, ethylenediamine, benzylamine, pyrrolidine, piperidine, morpholine, N- ethylpiperidine, 1-(2 - hydroxyethyl) - piperidine, and the like.

Such salts are prepared via conventional methods from preferably equimolar amounts of the free acid and the base in a suitable solvent such as water, methanol, ethanol, diethyl ether, chloroform, methylene chloride or the like.

The anti-inflammatory activity of the compound of Formula I can be determined in a number of animal tests. A significant activity is found, for example, in doses of between 10 and 25 mg./kg. on oral administration in the Bolus alba test on rat's paw according to G Wilhelmi, Jap. Journ. Pharmac. 15, 190 (1965) and the ultraviolet-erythema test in guinea pigs according to G. Wilhelmi, Schweiz. Med. Wschr. 80, 936 (1950). The anti-inflammatory activity, as well as the excellent compatibility of the compound of the invention is further apparent from the wound granuloma test according to Rudas, Subsidia Medica, 17, 30–37 (1965) and the cotton pellet granuloma test according to Meier, Experientia 6, 469 (1950). In these two tests the compound of the invention is active in doses as low as about 10 mg./kg. per die on oral administration to rats on 10 consecutive days, whereby a very favorable compatibility is observed. The very low toxicity of the compound of the invention as compared to fluphenamic acid is particularly noticeable.

The anti-inflammatory activity of the compound of the invention renders it suitable for the treatment of various inflammatory diseases, such as rheumatoid arthritis and spondylitis, painful shoulder and gout in mammals. For its intended use the compound of Formula I or a pharmaceutically acceptable salt thereof is administered in amounts depending on the species, age and weight of the subject under treatment as well as on the particular condition to be treated and the mode of administration. In general, the daily dosages vary between about 2 and 15 mg./kg., preferably between about 5 and 10 mg./kg.

In dosage units for peroral administration the content of active ingredient ranges preferably between 10% and 90%. They are produced by combining the active ingredient, e.g., with solid, pulverulent carriers, such as lactose, saccharose, sorbitol, mannitol; starches such as potato starch, maize starch or amylopectin, also laminaria powder or citrus pulp powder; cellulose derivatives or gelatine, optionally with the addition of lubricants, such as magnesium or calcium stearate or polyethylene glycols, to form tablets or dragée cores. The latter are coated, for example, with concentrated sugar solutions which can also contain, e.g., gum arabic, talcum and/or titanium dioxide, or with a lacquer dissolved in easily volatile organic solvents or mixtures of solvents. Dyestuffs can be added to these coatings, e.g. to indicate various dosages of active ingredient. Other suitable dosage units for oral administration are hard gelatine capsules and also soft closed capsules made of gelatine and a softener such as glycerine. The hard gelatine capsules preferably contain the active ingredient as a granulate mixed with lubricants, such as talcum or magnesium stearate, and optionally stabilizers such as sodium metabisulfite ($Na_2S_2O_5$) or ascorbic acid. In soft capsules, the active substance is preferably dissolved or suspended in suitable liquids, such as liquid polyethylene glycols, whereby likewise stabilizers can be added.

Suitable as dosage units for rectal administration are, for example, suppositories, consisting of a combination of an active substance with a suppository foundation substance based on natural or synthetic triglycerides (e.g. cocoa butter), polyethylene glycols or suitable higher fatty alcohols, and gelatine rectal capsules containing a combination of the active substance with polyethylene glycols.

Ampoule solutions for parenteral, particularly intramuscular or subcutaneous administration contain, for example, the free acid in a concentration preferably of 0.5–5% in the form of an aqueous dispersion, produced with the aid of normal dissolving agents and/or emulsifying agents and optionally of stabilizers, or preferably the aqueous solution of a pharmaceutically acceptable, water-soluble salt.

Examples of other parenteral forms which can be used are lotions, tinctures and ointments for percutaneous administration prepared with the usual auxiliary substances.

The following examples will serve to further illustrate the nature of the present invention, but should not be construed as a limitation on the scope thereof.

EXAMPLE 1

N-($\alpha,\alpha,\alpha,\alpha',\alpha',\alpha'$-hexafluoro - 3,5 - xylyl) - anthranilic acid.

A mixture of 710 g. of o-chlorobenzoic acid and 298 g. of 85% potassium hydroxide in 2500 ml. of n-pentanol are heated, while stirring, to a bath temperature of 160°. During 30 minutes about 1000 ml. of n-pentanol are distilled off. Then 1560 g. of $\alpha,\alpha,\alpha,\alpha',\alpha',\alpha'$ - hexafluoro-3,5-xylidine and 17 g. of copper powder are added and the mixture is refluxed for 15 hours, and then cooled. The mixture is poured into a solution of 244 g. of sodium carbonate in 2000 ml. of water and the resulting solution is distilled with steam. The excess $\alpha,\alpha,\alpha,\alpha',\alpha',\alpha'$-hexafluoro-3,5-xylidine is distilled off, active charcoal is added to the aqueous solution which is then filtered through Hyflo. The filtrate is acidified with concentrated hydrochloric acid. The crystals which precipitate are filtered, triturated with 10 liters of hot water, filtered again and crystallized from ethanol to give N-($\alpha,\alpha,\alpha,\alpha',\alpha',\alpha'$-hexafluoro-3,5-xylyl)-anthranilic acid, M.P. 195–197°.

EXAMPLE 2

1000 g. of N-($\alpha,\alpha,\alpha,\alpha',\alpha',\alpha'$-hexafluoro-3,5-xylyl)-anthranilic acid are mixed with 550 g. of lactose and 292 g. of potato starch. The mixture is moistened with an alcoholic solution of 8 g. of gelatine, and granulated through a sieve. After drying, 60 g. of potato starch, 60 g. of talcum, 10 g. of magnesium stearate and 20 g. of highly dispersed silicon dioxide are mixed in. From the mixture are pressed 10,000 tablets, each weighing 200 mg. and each containing 100 mg. of active ingredient. If desired, the tablets may be grooved for more accurate adjustment of the dosage.

EXAMPLE 3

100 g. of N-($\alpha,\alpha,\alpha,\alpha',\alpha',\alpha'$-hexafluoro-3,5-xylyl)-anthranilic acid are mixed thoroughly with 16 g. of maize starch and 6 g. of highly dispersed silicon dioxide. The mixture is moistened with a solution of 2 g. of stearic acid, 6 g. of ethyl cellulose and 6 g. of stearin in ca. 70 ml. of isopropanol, and granulated through a No. III sieve (Ph. Helv. V). The granulate is dried for approximately 14 hours and then pressed through a No. III–IIIa sieve. Then it is mixed with 16 g. of maize starch, 16 g. of talcum and 2 g. of magnesium stearate, and pressed to 1000 dragée cores. These are coated with a syrup consisting of 2 g. of lac, 7.5 g. of gum arabic, 0.15 g. of dyestuff, 2 g. of highly dispersed silicon dioxide, 25 g. of talcum and 53.35 g. of sugar, and dried. The resulting dragées weigh 260 mg. each and contain 100 mg. of active ingredient.

EXAMPLE 4

20 g. of N-($\alpha,\alpha,\alpha,\alpha',\alpha',\alpha'$-hexafluoro-3,5-xylyl)-anthranilic acid are dissolved in a mixture of 232 ml. of 1 N sodium hydroxide solution and 500 ml. of boiled water free of pyrogen and the solution is made up to 2000 ml. with more of the same water. The solution is filtered, filled into 1000 ampoules of 2 ml. each and sterilized. Each 2 ml. ampoule contains 20 mg. of N-($\alpha,\alpha,\alpha,\alpha',\alpha',\alpha'$-hexafluoro-3,5-xylyl)-anthranilic acid as active ingredient in the form of the sodium salt.

EXAMPLE 5

50 g. of N-($\alpha,\alpha,\alpha,\alpha',\alpha',\alpha'$-hexafluoro-3,5-xylyl)-anthranilic acid and 1950 g. of finely ground suppository foundation substance (e.g. cocoa butter) are thoroughly mixed and then melted. From the melt which is kept homogeneous by stirring, 1000 suppositories of 2 g. each are poured. They each contain 50 mg. of active ingredient.

EXAMPLE 6

A mixture of 60.0 g. of polyoxyethylene anhydro sorbite-monostearate, 30.0 g. of anhydro sorbite-monostearate, 150.0 g. of paraffin oil and 120.0 g. of stearyl alcohol is melted and 50.0 g. of finely pulverized N-($\alpha,\alpha,\alpha,\alpha',\alpha',\alpha'$-hexafluoro-3,5-xylyl)-anthranilic acid are added thereto and then 590 ml. of water, having a temperature of 40°, are added to form an emulsion. The emulsion is stirred until it has cooled to room temperature and then filled into tubes.

EXAMPLE 7

A mixture of 3.5 g. of N-($\alpha,\alpha,\alpha,\alpha',\alpha',\alpha'$-hexafluoro-3,5-xylyl)-anthranilic acid and 10 ml. of 1 N sodium hydroxide is evaporated in vacuum to dryness. The residue is recrystallized from ether and petrolether to give the sodium salt of N-($\alpha,\alpha,\alpha,\alpha',\alpha',\alpha'$-hexafluoro-3,5-xylyl)-anthranilic acid as colorless crystals, M.P. 289–293°.

What is claimed is:

1. N-($\alpha,\alpha,\alpha,\alpha',\alpha',\alpha'$-hexafluoro - 3,5 - xylyl)-anthranilic acid of the formula

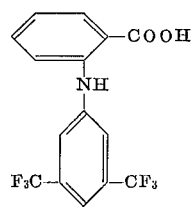

2. A pharmaceutically acceptable salt of the compound as defined in claim 1 with a base.

References Cited

UNITED STATES PATENTS 2,553,914  5/1951  Goldberg _____ 260—518
3,313,848  4/1967  Scherrer _____ 260—518

FOREIGN PATENTS 952,963  12/1964  France _____ 260—518

OTHER REFERENCES

Chem. Abstracts, 65:7108f.

JAMES A. PATTEN, Primary Examiner
V. GARNER, Assistant Examiner

U.S. Cl. X.R.

260—294, 326.3, 501.11, 518, 999; 424—248, 267, 274, 316, 319